US012788688B2

(12) United States Patent
Arai et al.

(10) Patent No.: US 12,788,688 B2
(45) Date of Patent: Nov. 10, 2026

(54) DRUG SUPPLY APPARATUS

(71) Applicant: PHC Holdings Corporation, Tokyo (JP)

(72) Inventors: Shinichi Arai, Gunma (JP); Yoshirou Katou, Ehime (JP); Takeshi Azuma, Ehime (JP); Yasushi Hirai, Ehime (JP)

(73) Assignee: PHC HOLDINGS CORPORATION, Tokyo (JP)

( * ) Notice: Subject to any disclaimer, the term of this patent is extended or adjusted under 35 U.S.C. 154(b) by 241 days.

(21) Appl. No.: 18/638,153

(22) Filed: Apr. 17, 2024

(65) Prior Publication Data

US 2024/0277577 A1 Aug. 22, 2024

Related U.S. Application Data

(63) Continuation of application No. PCT/JP2022/039549, filed on Oct. 24, 2022.

(30) Foreign Application Priority Data

Oct. 28, 2021 (JP) ................................ 2021-176521

(51) Int. Cl.
*A61J 7/00* (2006.01)
*A61J 1/03* (2023.01)

(52) U.S. Cl.
CPC ............... *A61J 7/0076* (2013.01); *A61J 1/03* (2013.01)

(58) Field of Classification Search
CPC .................................. A61J 7/0076; A61J 1/03
See application file for complete search history.

(56) References Cited

U.S. PATENT DOCUMENTS 6,471,088 B1 * 10/2002 Uema ..................... G07F 11/44 221/9

FOREIGN PATENT DOCUMENTS

| | | | | | |
|---|---|---|---|---|---|
| CN | 102596725 A | * | 7/2012 | ............. | B65D 88/26 |
| JP | 57-002241 Y | | 1/1982 | | |
| JP | 2013158461 A | * | 8/2013 | | |

OTHER PUBLICATIONS

Translation of CN-102596725-A (Year: 2026).*
Translation of JP-2013158461-A (Year: 2026).*
Extended European Search Report dated Mar. 14, 2025 issued in the corresponding European Patent Application No. 22886958.2.
International Search Report dated Nov. 22, 2022 issued in International Patent Application No. PCT/JP2022/039549, with English translation.

* cited by examiner

*Primary Examiner* — Howard J Sanders
(74) *Attorney, Agent, or Firm* — Rimon P.C.

(57) ABSTRACT

A drug supply apparatus of the present disclosure includes a plurality of tablet cases for discharging a drug and lined up in a front-rear direction of the drug supply apparatus, and a chute disposed at a position lower than the position of the plurality of tablet cases and including a path for conveying the drug, the chute conveying the drug while preventing the drug from spilling from a front side and a rear side of the chute. In the drug supply apparatus, the width of the chute in the front-rear direction becomes smaller toward the downstream side in the chute, and the path includes a bent part having a shape such that the bent part is bent when viewed from the front side.

11 Claims, 6 Drawing Sheets

DRUG SUPPLY APPARATUS

CROSS-REFERENCE OF RELATED APPLICATIONS

This application is a Continuation of International Patent Application No. PCT/JP2022/039549, filed on Oct. 24, 2022, which in turn claims the benefit of Japanese Patent Application No. 2021-176521, filed on Oct. 28, 2021, the entire disclosure of which Applications are incorporated by reference herein.

TECHNICAL FIELD

The present disclosure relates to a drug supply apparatus.

BACKGROUND ART

Patent Literature (hereinafter, referred to as PTL) 1 describes a drug supply apparatus that discharges drugs specified by a prescription from a plurality of tablet cases arranged in the up-down direction and front-rear direction, collects the discharged drugs in a hopper disposed below these tablet cases and wraps the drugs in packaging paper.

CITATION LIST

Patent Literature

PTL 1
Publication of Utility Model Application S57-2241

SUMMARY OF INVENTION

Technical Problem

In the drug supply apparatus of PTL 1, as the number of tablet cases arranged in the front-rear direction increases, for example, the length of the hopper becomes longer in the front-rear direction, thereby increasing the size of the hopper. This configuration makes the hopper difficult to handle. In addition, when the conveyance speed of a drug is lowered while being conveyed by the hopper and thus the timing at which the drug is led out from the hopper is delayed, the timing at which the drug is packaged and the timing at which the drug is provided to the patient are also delayed.

For addressing such problems, a chute for conveying drugs is disposed between the tablet case and the hopper. The chute is formed, for example, in such a way that drugs are conveyed along the left-right direction, and that the width of the chute in the front-rear direction becomes smaller toward the downstream side in the chute.

In this case, as the number of tablets arranged in the front-rear direction increases, the width of the chute in the front-rear direction increases on the upstream side. Accordingly, the difference between the width of the chute in the front-rear direction on the upstream side and the width of the chute in the front-rear direction on the downstream side, that is, the change rate in the width of the chute in the front-rear direction increases. This configuration may prevent the chute from conveying drugs smoothly. Specifically, the speed of a drug slows down as it travels along the side wall that defines the width of the chute in the front-rear direction, or when the drug hits the side wall, it bounces off in a direction that is significantly different from the conveyance direction. As a result, when the timing at which the drug is led out from the chute is delayed, the timing at which the drug is provided to the patient is also delayed.

An object of the present disclosure is provide a drug supply apparatus capable of smoothly supplying drugs.

Solution to Problem

A drug supply apparatus in the present disclosure includes a plurality of tablet cases for discharging a drug and lined up in a front-rear direction of the drug supply apparatus, and a chute disposed at a position lower than a position of the plurality of tablet cases and including a path for conveying the drug, the chute conveying the drug while preventing the drug from spilling from a front side and a rear side of the chute. In the drug supply apparatus, the width of the chute in the front-rear direction becomes smaller toward the downstream side in the chute, and the path includes a bent part having a shape such that the bent part is bent when viewed from the front side.

Advantageous Effects of Invention

The drug supply apparatus of the present disclosure can smoothly supply drugs.

DESCRIPTION OF EMBODIMENTS

Hereinafter, at least one embodiment of the drug supply apparatus of the present disclosure will be described with reference to the drawings. In the following description, as indicated by the arrows in FIG. 1, the side where handles 13*a* of shelves 13 are disposed is referred to as the front of drug supply apparatus 1. The front-rear direction of drug supply apparatus 1 is the direction in which tablet cases C stored in shelf 13 are arranged, as described below. In addition, the left-right direction when drug supply apparatus 1 is viewed from the front thereof is referred to as the left-right direction of drug supply apparatus 1. The side away from the surface on which drug supply apparatus 1 is installed is referred to as the top of drug supply apparatus 1 (upward or above the apparatus), and the up-down direction of drug supply apparatus 1 is a direction orthogonal to the front-rear direction and the left-right direction of drug supply apparatus 1.

Figure 1:
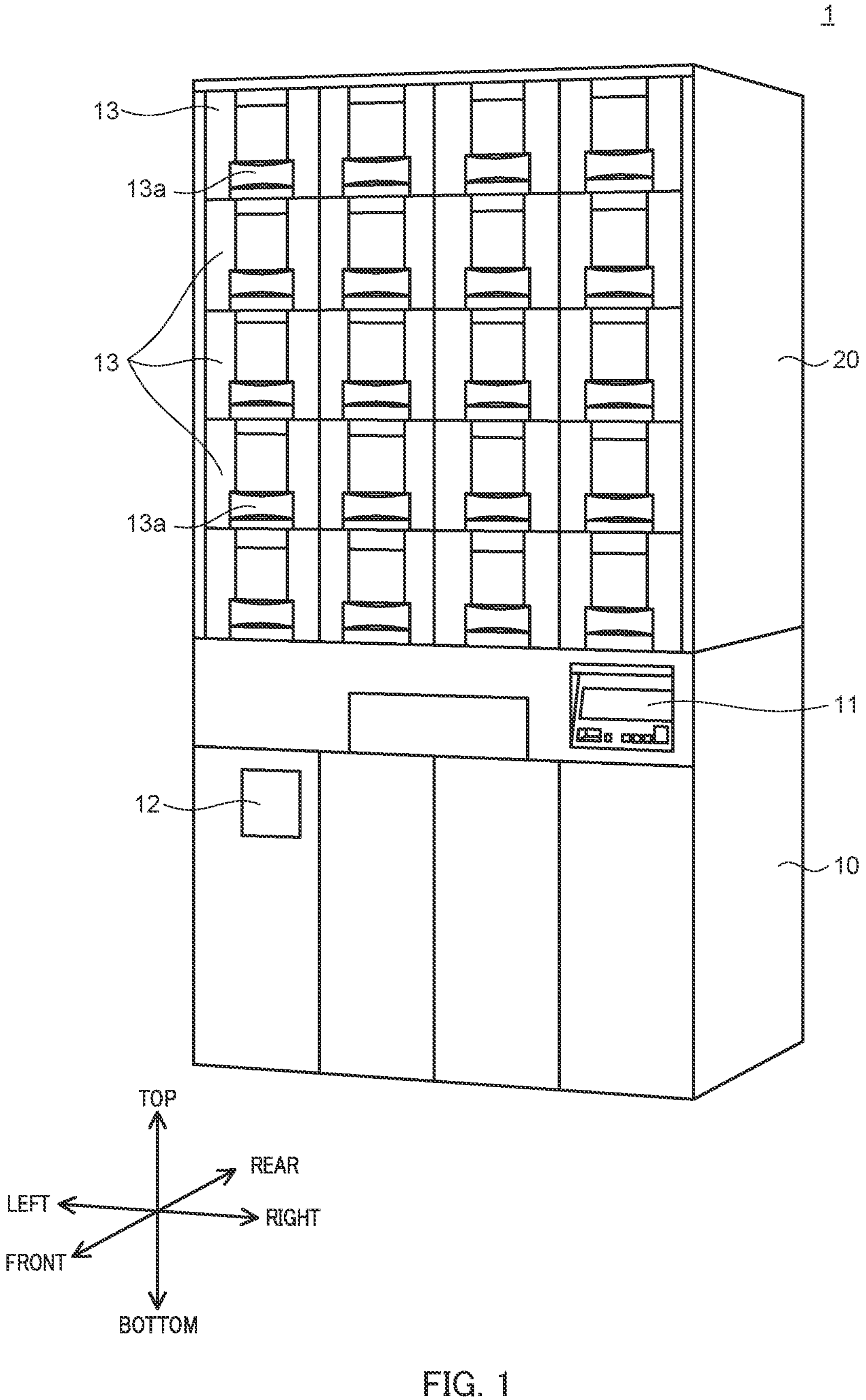
FIG. 1 is a perspective view of a drug supply apparatus according to an embodiment of the present disclosure.

FIG. 1 is a perspective view of exemplary drug supply apparatus 1. Drug supply apparatus 1 includes first floor part 10 and second floor part 20.

First floor part 10 includes operation part 11 and take-out part 12. In addition, first floor part 10 includes input part (not illustrated).

Operation part 11 is a device to be operated by an operator, and includes, for example, a display, operation buttons, and the like. Various information is input to drug supply apparatus 1 as the operator operates operation part 11.

A drug (herein, a drug may be more than one drug) packaged in drug supply apparatus 1 is taken out from take-out part 12. Take-out part 12 includes an opening, and the operator takes out the drug from the opening.

The input part is an input device for receiving various information input from an external device. The input part is connected to, for example, a personal computer, and receives input from the personal computer, for example, information on a prescription issued at a medical institution.

Figure 2:
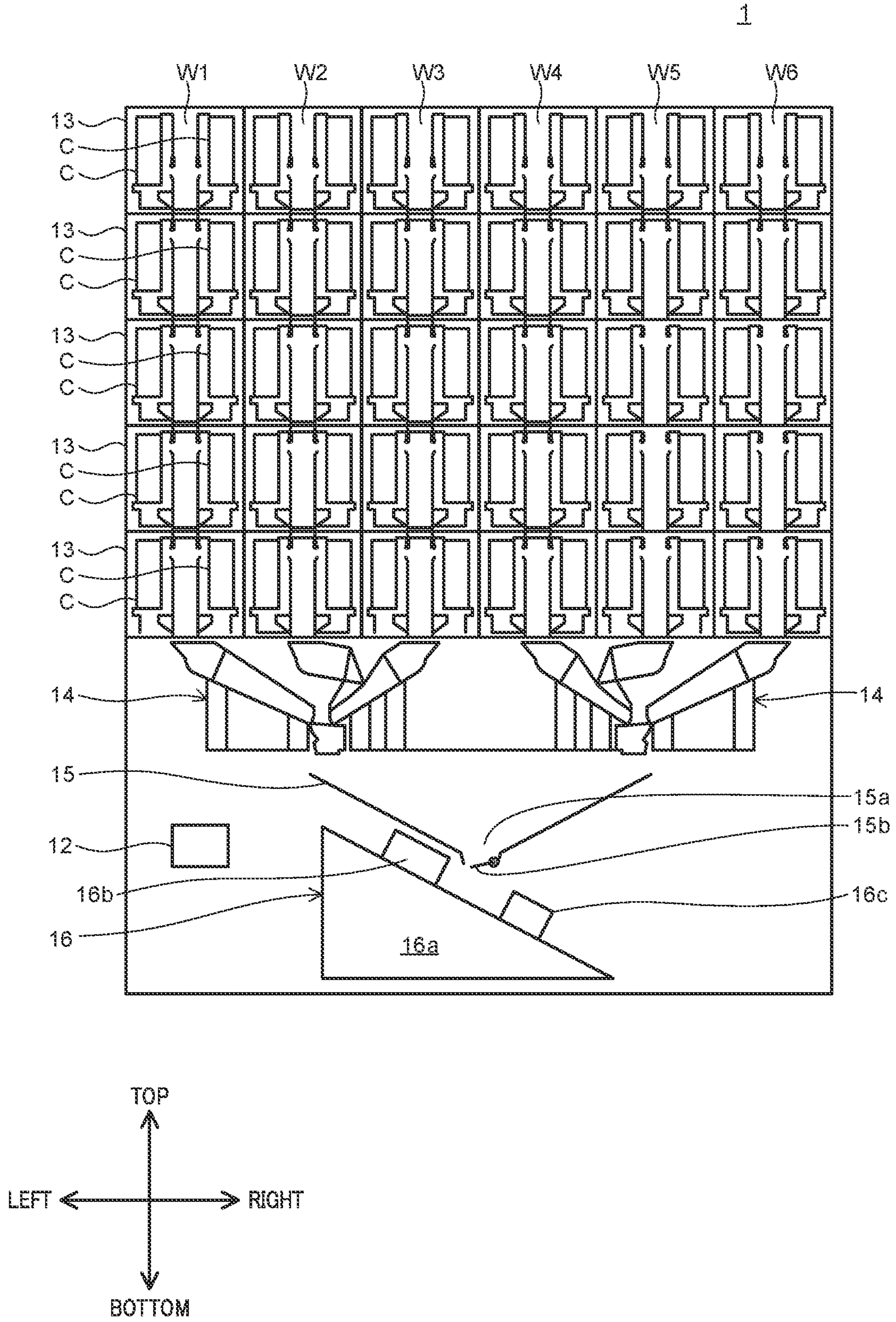
FIG. 2 is a longitudinal cross-sectional view of the drug supply apparatus.

FIG. 2 is a longitudinal cross-sectional view of drug supply apparatus 1. Drug supply apparatus 1 includes a plurality of shelves 13, chute units 14, hopper 15, packaging unit 16, and control part (not illustrated) which performs overall control of drug supply apparatus 1.

The plurality of shelves 13 are each configured to store the plurality of tablet cases C in second floor part 20. The plurality of shelves 13 are disposed in such a way that each shelf is pulled out along the front-rear direction by operating handle 13*a*. Drug supply apparatus 1 includes 30 shelves 13. The plurality of shelves 13 are arranged in five stages in the up-down direction and in six rows in the left-right direction. The number and arrangement of shelves 13 provided in second floor part 20 are not limited to those of the present embodiment, and the number of stages in the up-down direction and/or the number of rows in the left-right direction may be more or less than those described above.

A plurality of tablet cases C are stored in each shelf 13 so as to be arranged along the front-rear direction of shelf 13 on both sides of shelf 13 in the left-right direction. Each tablet case C stores a plurality of drugs. Each tablet case C is configured to discharge one tablet of a drug at a time.

The drug discharged from tablet case C falls through a passage and is led into first floor part 10. A passage is provided so as to penetrate each shelf 13 in the up-down direction. The plurality of shelves 13 are arranged in six rows in the left-right direction as described above. That is, drug supply apparatus 1 includes six passages, namely, first to sixth passages W1 to W6. First to sixth passages W1 to W6 are each formed to extend along the front-rear direction so as to correspond to tablet cases C arranged in the front-rear direction.

Chute units 14 are disposed at first floor part 10, that is, at positions lower than those of tablet cases C, and are configured to lead drugs led out from first to sixth passages W1 to W6 into hopper 15. Drug supply apparatus 1 includes two chute units 14. The two chute units 14 are disposed side by side along the left-right direction of drug supply apparatus 1. Two chute units 14 are formed similarly to each other, and are disposed symmetrically when viewed from the front of drug supply apparatus 1, that is, from the front side.

Chute unit 14 disposed on the left side of drug supply apparatus 1 receives drugs led out from first to third passages W1 to W3 and leads the drugs into hopper 15. Chute unit 14 disposed on the right side of drug supply apparatus 1 receives drugs led out from fourth to sixth passages W4 to W6 and leads the drugs into hopper 15. Naturally, the number of chute units 14 and which chute unit 14 receives drugs discharged from which passage are not limited to the configuration described above. Details of chute unit 14 will be described below.

Hopper 15 is configured to receive a drug led out from chute unit 14, and lead the received drug through outlet 15*a* into packaging unit 16. Outlet 15*a* is provided approximately at the center portion of hopper 15. Hopper 15 includes shutter 15*b* that opens and closes outlet 15*a*.

Packaging unit 16 is configured to package a plurality of drugs led out from hopper 15. Packaging unit 16 includes conveying part 16*a*, printer 16*b*, and sealing device 16*c*.

Conveying part 16*a* is, for example, a device that feeds out packaging paper from a roller (not illustrated) around which the packaging paper is wound, and conveys the fed out packaging paper toward sealing device 16*c*. The packaging paper is, for example, strip-shaped packaging paper having been folded in half. The drugs led out from hopper 15 is placed on packaging paper and is conveyed together with the packaging paper toward sealing device 16*c*.

Printer 16*b* is a printing machine for printing, for example, the patient's name, the name of the drug to be supplied in the packaging paper fed out from the roller, the date and time of administration, and the like on the surface of the packaging paper.

Sealing device 16*c* is for sealing the packaging paper in which a drug is wrapped.

The packaging paper in which the drug is enclosed is, for example, cut with predetermined timing and conveyed toward take-out part 12 by a predetermined device.

Figure 3:
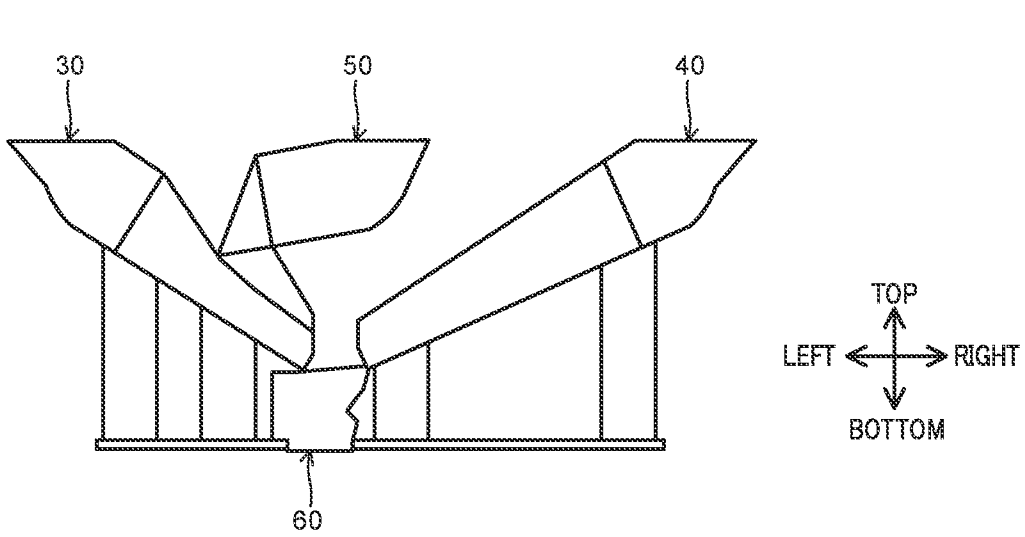
FIG. 3 is a front view of a chute unit.

In the following, chute unit 14 will be described. FIG. 3 illustrates a front of chute unit 14. Chute unit 14 includes first to third chutes 30 to 50 and shutter part 60.

Figure 4:
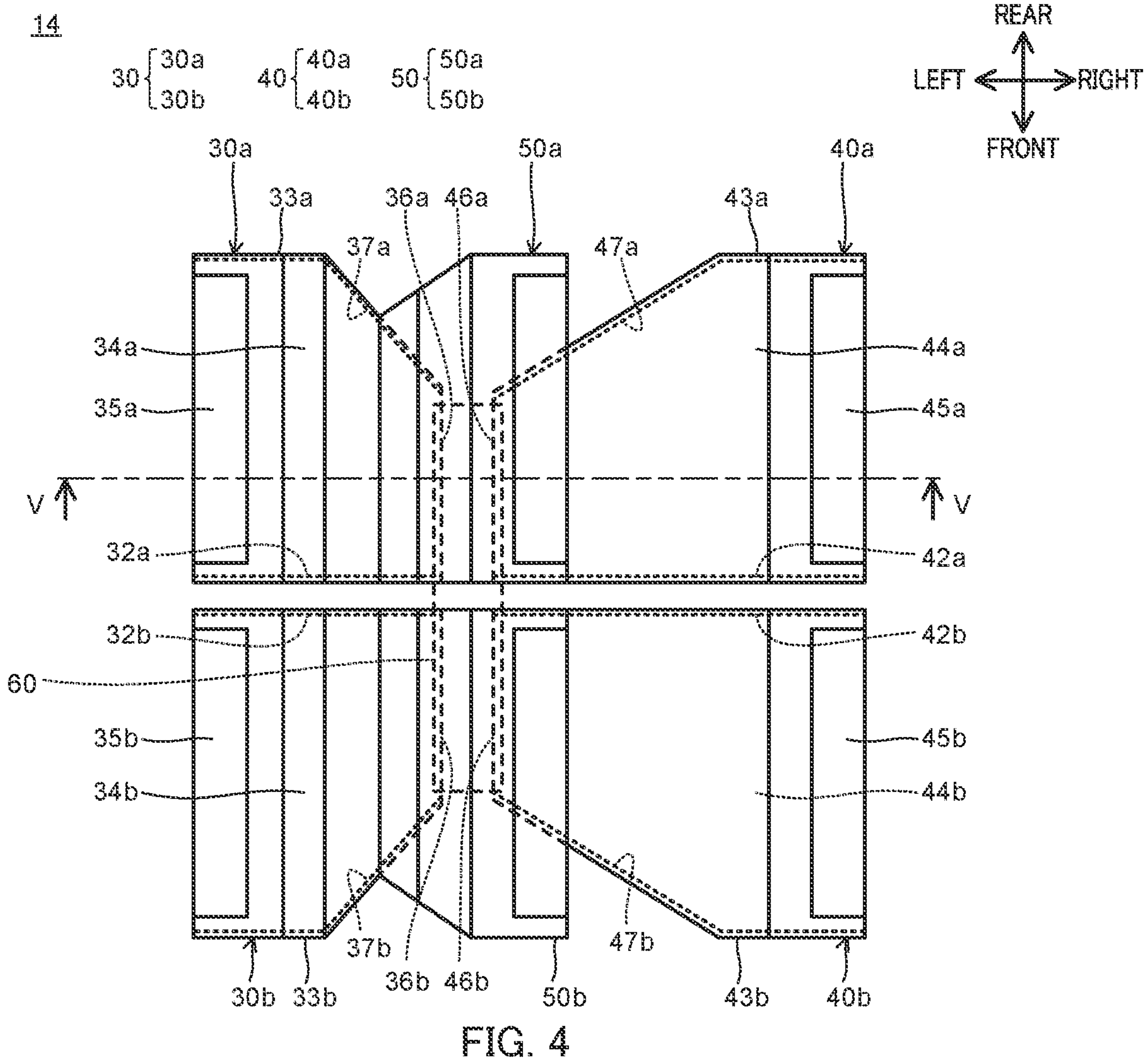
FIG. 4 is a top view of the chute unit.

FIG. 4 is a top view of chute unit 14. First to third chutes 30 to 50 are each composed of a pair of chutes disposed side by side along the front-rear direction. Specifically, first chute 30 is composed of first rear chute 30*a* disposed on the rear side and first front chute 30*b* disposed on the front side. First rear chute 30*a* and first front chute 30*b* are symmetrical to each other in the front-rear direction. In a similar manner, second chute 40 is composed of second rear chute 40*a* disposed on the rear side and second front chute 40*b* disposed on the front side, which are symmetrical to each other in the front-rear direction, and third chute 50 is composed of third rear chute 50*a* disposed on the rear side and third front chute 50*b* disposed on the front side, which are symmetrical to each other in the front-rear direction.

In the following, the configurations of first rear chute 30*a*, second rear chute 40*a*, and third rear chute 50*a* will be described with "a" added to the end of the reference numerals thereof. In FIGS. 3 to 7, the reference numerals of the components of first to third front chutes 30*b* to 50*b* have the suffix "b" in place of the suffix "a" of the reference numerals of the components of first to third rear chutes 30*a* to 50*a* that correspond to the components of first to third front chutes 30*b* to 50*b*.

As illustrated in FIG. 4, first rear chute 30*a* is disposed on the left side of chute unit 14. First rear chute 30*a* receives a drug led out from fourth passage W4 and leads the drug into shutter part 60.

Figure 5:
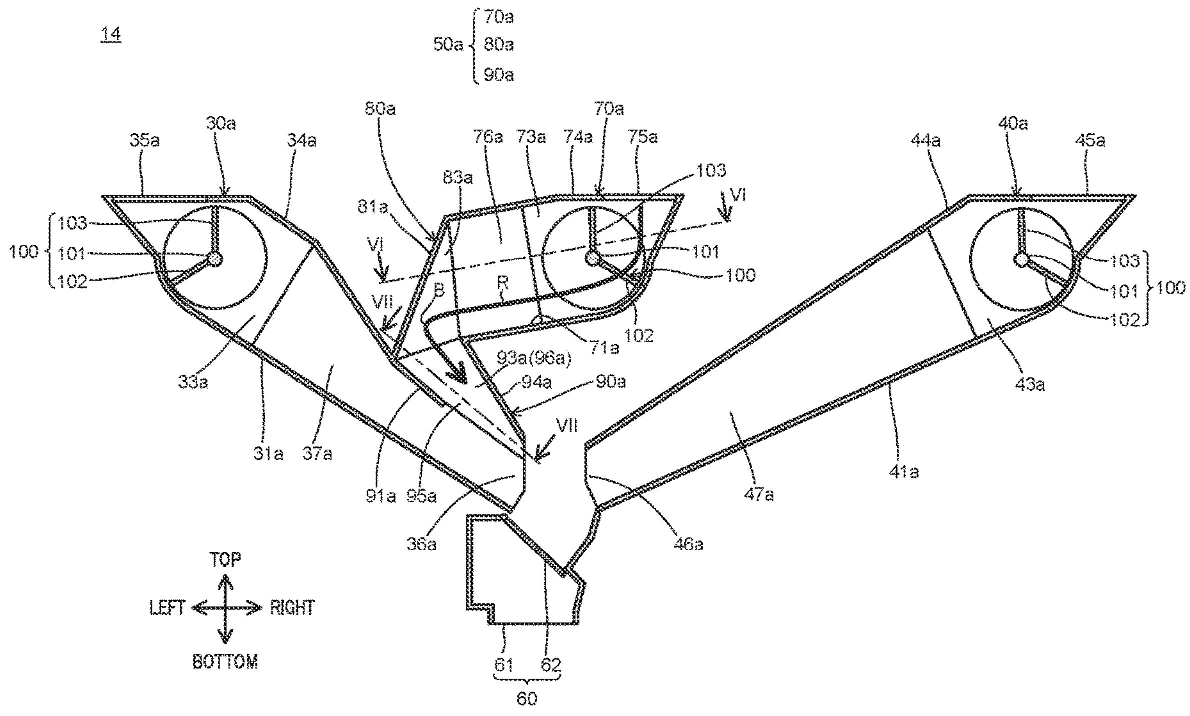
FIG. 5 is a cross-sectional view taken along line V-V illustrated in FIG. 4.

FIG. 5 is a cross-sectional view of chute unit 14 taken along line V-V in FIG. 4. As illustrated in FIGS. 4 and 5, first rear chute 30*a* is formed by first bottom wall 31*a*, first front wall 32*a*, first rear wall 33*a*, and first top wall 34*a*. First rear chute 30*a* includes first inlet 35*a* and first outlet 36*a*.

First inlet 35*a* is formed to open upward at the left end portion of first rear chute 30*a*. A drug led out from fourth passage W4 is introduced into first inlet 35*a*. First inlet 35*a* is formed so as to correspond to the arrangement direction of tablet cases C stored on shelf 13, that is, the front-rear direction thereof is the longitudinal direction.

As illustrated in FIG. 5, first outlet 36*a* is formed at the right end of first rear chute 30*a* and below first inlet 35*a*, and leads a drug from first rear chute 30*a* into shutter part 60.

The width of first outlet 36*a* in the front-rear direction is smaller than the width of first inlet 35*a* in the front-rear direction.

In first rear chute 30*a*, a path through which a drug is conveyed is formed so as to be surrounded by first bottom wall 31*a*, first front wall 32*a*, first rear wall 33*a*, and first top wall 34*a*.

First bottom wall 31*a* is disposed to be inclined so that a drug travels on the plate surface of first bottom wall 31*a* from the upper side to the lower side as the drag travels from the upstream side (the first inlet 35*a* side) to the downstream side (the first outlet 36*a* side). First front wall 32*a* and first rear wall 33*a* are disposed to face each other in the front-rear direction of first rear chute 30*a* so as to prevent a drug from spilling from the front and rear sides. In addition, first front wall 32*a* and first rear wall 33*a* guide a drug from first inlet 35*a* to first outlet 36*a*. The width of first rear chute 30*a* in the front-rear direction becomes smaller toward the downstream side. Specifically, first rear wall 33*a* includes first inclined surface 37*a* that is inclined so that the width of first rear chute 30*a* in the front-rear direction becomes smaller toward the downstream side.

In addition, first inclined surface 37*a* is formed in such a way that the inclination angle with respect to the left-right direction is 45 degrees or less. This configuration allows first rear chute 30*a* to smoothly convey a drug, as described in detail below. Herein, the inclination angle of first inclined surface 37*a* with respect to the left-right direction is the angle with respect to the left-right direction when viewed along the direction orthogonal to the plate surface of first bottom wall 31*a*.

First top wall 34*a* is disposed to face first bottom wall 31*a* so as to more reliably prevent a drug from spilling from the front or rear side.

Second rear chute 40*a* is disposed on the right side of chute unit 14. In a similar manner as first rear chute 30*a*, second rear chute 40*a* is formed by second bottom wall 41*a*, second front wall 42*a*, second rear wall 43*a*, and second top wall 44*a*, and second rear chute 40*a* includes second inlet 45*a* and second outlet 46*a*.

A drug led out from sixth passage W6 is introduced into second inlet 45*a*. Second rear chute 40*a*, unlike first rear chute 30*a*, conveys a drug from the right side to the left side. That is, second inlet 45*a* is formed at the right end portion of second rear chute 40*a*, and second outlet 46*a* is formed at the left end of second rear chute 40*a* and below second inlet 45*a*.

In second rear chute 40*a*, a path through which a drug is conveyed is formed so as to be surrounded by second bottom wall 41*a*, second front wall 42*a*, second rear wall 43*a*, and second top wall 44*a*. The distance in the left-right direction between second inlet 45*a* and second outlet 46*a* in second rear chute 40*a* is larger than the distance in the left-right direction between first inlet 35*a* and first outlet 36*a* in the first rear chute 30*a*. Accordingly, the length of the path through which a drug is conveyed in second rear chute 40*a* is larger than the length of the path of first rear chute 30*a*.

In addition, the inclination angle of second bottom wall 41*a* with respect to the horizontal direction is smaller than the inclination angle of first bottom wall 31*a* with respect to the horizontal direction. Furthermore, the inclination angle of second inclined surface 47*a* of second rear wall 43*a* in second rear chute 40*a* with respect to the left-right direction is smaller than the inclination angle of first inclined surface 37*a* in first rear chute 30*a* with respect to the left-right direction, and is less than 45 degrees.

Third rear chute 50*a* is disposed at the center portion of chute unit 14 in the left-right direction. Third rear chute 50*a* receives a drug led out from fifth passage W5 and leads the drug into shutter part 60. Path R for conveying a drug in third rear chute 50*a* is indicated by a thick arrow in FIG. 5. Third rear chute 50*a* includes upstream chute 70*a*, connecting part 80*a*, and downstream chute 90*a*.

Figure 6:
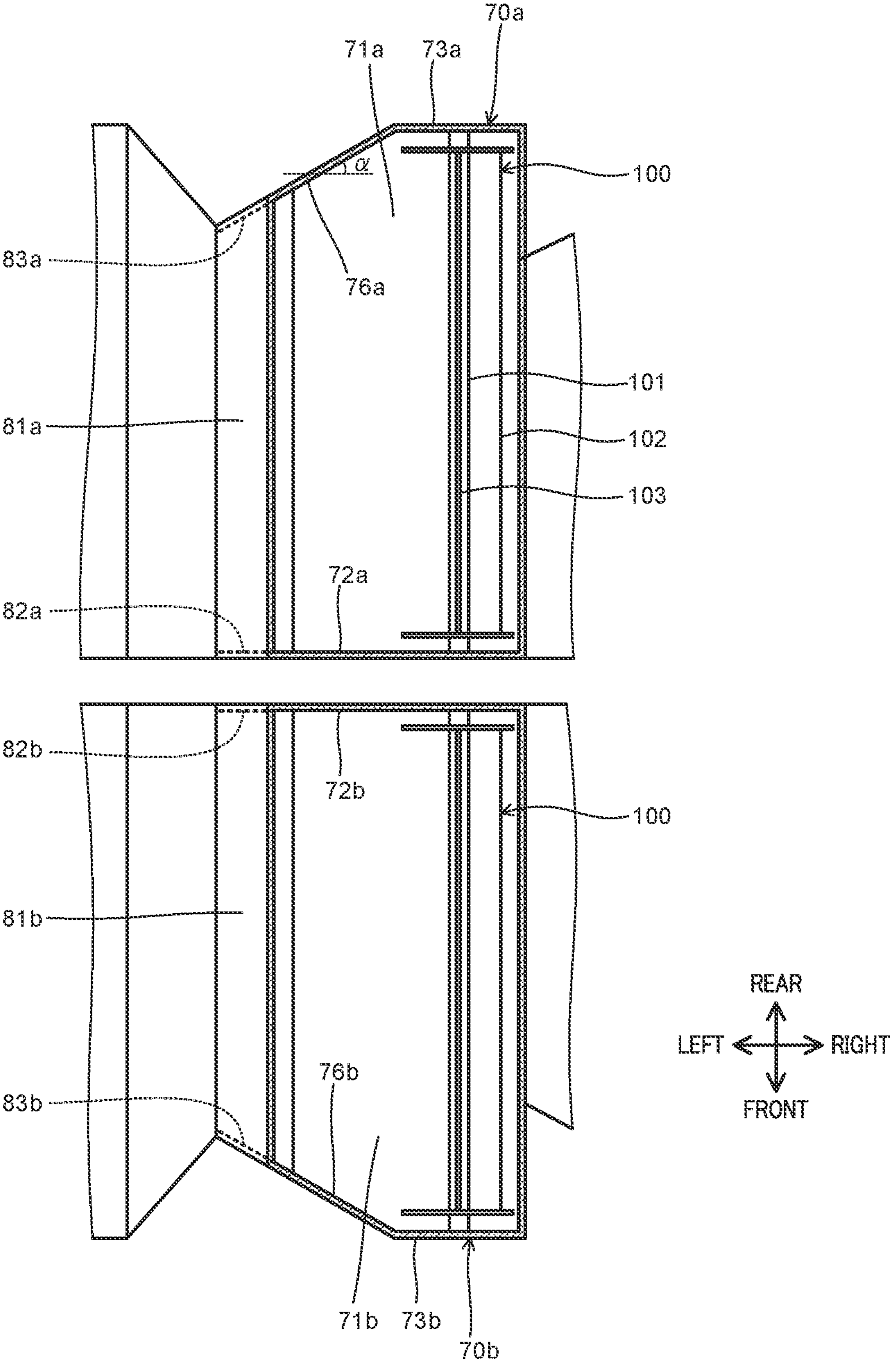
FIG. 6 is a cross-sectional view taken along line VI-VI illustrated in FIG. 5.

Upstream chute 70*a* is disposed upstream of connecting part 80*a*. As illustrated in FIGS. 5 and 6, upstream chute 70*a* is formed by third bottom wall 71*a*, third front wall 72*a*, third rear wall 73*a*, and third top wall 74*a*. Upstream chute 70*a* includes third inlet 75*a*. FIG. 6 is a cross-sectional view of upstream chute 70*a* cut along a plane parallel to the plate surface of third bottom wall 71*a*, as viewed along a direction orthogonal to the plate surface of third bottom wall 71*a*.

Third inlet 75*a* is formed to open upward at the upper end portion of third rear chute 50*a*. A drug led out from fifth passage W5 is introduced into third inlet 75*a*. Third inlet 75*a* is formed so as to correspond to the arrangement direction of tablet cases C stored on shelf 13, that is, the front-rear direction thereof is the longitudinal direction.

In upstream chute 70*a*, path R through which a drug is conveyed is formed so as to be surrounded by third bottom wall 71*a*, third front wall 72*a*, third rear wall 73*a*, and third top wall 74*a*.

As illustrated in FIG. 5, third bottom wall 71*a* is disposed to be inclined so that a drug travels on the plate surface of third bottom wall 71*a* from the upper side to the lower side as the drag travels from the upstream side (the third inlet 75*a* side) to the downstream side (left side: the connecting part 80*a* side).

Third front wall 72*a* and third rear wall 73*a* are disposed to face each other in the front-rear direction of upstream chute 70*a* so as to prevent a drug from spilling from the front and rear sides. In addition, third front wall 72*a* and third rear wall 73*a* guide a drug from third inlet 75*a* to connecting part 80*a*. The width of upstream chute 70*a* in the front-rear direction becomes smaller toward the downstream side. Specifically, third rear wall 73*a* includes third inclined surface 76*a* that is inclined so that the width of upstream chute 70*a* in the front-rear direction becomes smaller toward the downstream side.

The symbol $\alpha$ illustrated in FIG. 6 indicates an inclination angle (hereinafter referred to as an upstream inclination angle) of third inclined surface 76*a* with respect to the left-right direction. As third inclined surface 76*a* is disposed to be inclined at the upstream inclination angle $\alpha$ in such a manner, the width of upstream chute 70*a* in the front-rear direction becomes smaller at a constant change rate toward the downstream side.

Third top wall 74*a* illustrated in FIG. 5 is disposed to face third bottom wall 71*a* so as to more reliably prevent a drug from spilling from the front or rear side of the chute.

Connecting part 80*a* connects upstream chute 70*a* with downstream chute 90*a*, and leads a drug, having passed through upstream chute 70*a*, into downstream chute 90*a*. As illustrated in FIGS. 5 and 6, connecting part 80*a* is formed by bouncing wall 81*a*, fourth front wall 82*a*, and fourth rear wall 83*a*.

In connecting part 80*a*, path R through which a drug is conveyed is formed so as to be surrounded by bouncing wall 81*a*, fourth front wall 82*a*, and fourth rear wall 83*a*. Path R formed in connecting part 80*a* includes bent part B having a shape such that the bent part is bent when viewed from the front side. As illustrated in FIG. 5, bent part B is a portion where path R is bent at connecting part 80*a*. In addition, path R formed in connecting part 80*a* has a shape such that path R is folded back (dog-legged) at bent part B when viewed from the front side.

Bouncing wall 81*a* bounces a drug, having passed through upstream chute 70*a*, toward downstream chute 90*a*. Specifically, bouncing wall 81*a* is disposed so that the plate surface thereof faces diagonally downward. Accordingly, a drug is reliably bounced toward downstream chute 90*a* by bouncing wall 81*a*.

Fourth front wall 82*a* and fourth rear wall 83*a* are disposed to face each other in the front-rear direction of connecting part 80*a* so as to prevent a drug from spilling from the front and rear sides of the chute. Fourth front wall 82*a* and fourth rear wall 83*a* guide a drug, having passed through upstream chute 70*a*, to downstream chute 90*a*. The width of connecting part 80*a* in the front-rear direction becomes smaller toward the downstream side. Specifically, the angle between the plate surface of fourth rear wall 83*a* and the vertical direction is set to be 45 degrees or less.

Figure 7:
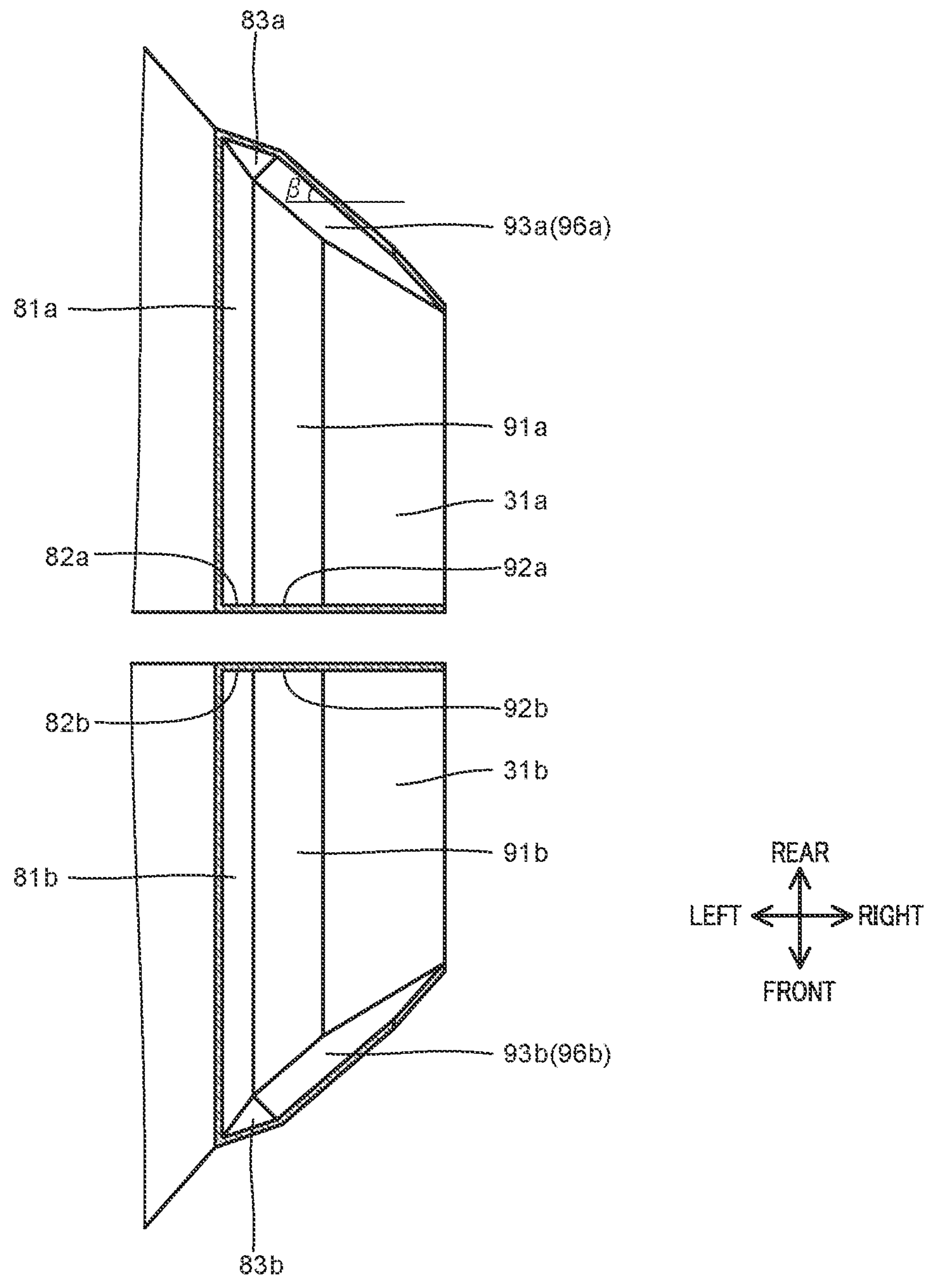
FIG. 7 is a cross-sectional view taken along line VII-VII illustrated in FIG. 5.

Downstream chute 90*a* is disposed downstream of connecting part 80*a*. As illustrated in FIGS. 5 and 7, downstream chute 90*a* is formed by fourth bottom wall 91*a*, fifth front wall 92*a*, fifth rear wall 93*a*, and fourth top wall 94*a*. Downstream chute 90*a* includes third outlet 95*a*. FIG. 7 is a cross-sectional view of downstream chute 90*a* cut along a plane parallel to the plate surface of fourth bottom wall 91*a*, as viewed along a direction orthogonal to the plate surface of fourth bottom wall 91*a*.

Third outlet 95*a* is formed at the lower end portion of third rear chute 50*a* and below third inlet 75*a*. Third outlet 95*a* leads a drug, having passed through downstream chute 90*a*, into shutter part 60 via first rear chute 30*a*. The distance in the left-right direction between third outlet 95*a* and third inlet 75*a* is smaller than the distance in the left-right direction between first outlet 36*a* and first inlet 35*a* in first rear chute 30*a*.

In downstream chute 90*a*, path R through which a drug is conveyed is formed so as to be surrounded by fourth bottom wall 91*a*, fifth front wall 92*a*, fifth rear wall 93*a*, and fourth top wall 94*a*.

Fourth bottom wall 91*a* is disposed to be inclined so that a drug travels on the plate surface of fourth bottom wall 91*a* from the upper side to the lower side as the drag travels from the upstream side (the connecting part 80*a* side) to the downstream side (right side: the third outlet 95*a* side).

Fifth front wall 92*a* and fifth rear wall 93*a* are disposed to face each other in the front-rear direction of downstream chute 90*a* so as to prevent a drug from spilling from the front and rear sides. In addition, fifth front wall 92*a* and fifth rear wall 93*a* guide a drug, having passed through connecting part 80*a*, to third outlet 95*a*. The width of downstream chute 90*a* in the front-rear direction becomes smaller toward the downstream side. Specifically, fifth rear wall 93*a* is formed to include fourth inclined surface 96*a* that is inclined so that the width of downstream chute 90*a* in the front-rear direction becomes smaller toward the downstream side. In addition, fourth inclined surface 96*a* is formed to face diagonally upward.

The symbol β illustrated in FIG. 7 indicates an inclination angle (hereinafter referred to as a downstream inclination angle) of fourth inclined surface 96*a* with respect to the left-right direction. As fourth inclined surface 96*a* is disposed to be inclined at the downstream inclination angle β in such a manner, the width of downstream chute 90*a* in the front-rear direction becomes smaller at a constant change rate toward the downstream side.

In addition, the change rate of the width of upstream chute 70*a* in the front-rear direction is smaller than the change rate of the width of downstream chute 90*a* in the front-rear direction. Specifically, the upstream inclination angle α is set to be smaller than the downstream inclination angle β. Furthermore, the upstream inclination angle α and the downstream inclination angle ß are set to be 45 degrees or less. This configuration allows third rear chute 50*a* to smoothly convey a drug, as described in detail below.

Fourth top wall 94*a* illustrated in FIG. 5 is disposed to face fourth bottom wall 91*a* so as to more reliably prevent a drug from spilling from the front or rear side of the chute.

Shutter part 60 includes cylindrical member 61 and shutter 62. Cylindrical member 61 includes openings on the upper side and the lower side thereof, and a drug passes through cylindrical member 61. Shutter 62 opens and closes the opening of cylindrical member 61. When shutter 62 is in the closed state, the drug can be stored. When shutter 62 is in the opened state, the drug is led into hopper 15.

In addition, as illustrated in FIGS. 5 and 6, chute unit 14 further includes rotating members 100. Rotating members 100 are respectively disposed at the upstream end portions of first rear chute 30*a*, second rear chute 40*a*, and upstream chute 70*a* of third rear chute 50*a*. In the following, rotating member 100 disposed in upstream chute 70*a* will be described.

Rotating member 100 stores a drug introduced from third inlet 75*a* and, by rotating, sends out the stored drug to the downstream side in upstream chute 70*a*. Rotating member 100 includes shaft member 101, storage part 102, and delivery part 103.

Shaft member 101 is disposed so that the axis line thereof extends in the front-rear direction and is disposed to be rotatable about the axis line with respect to upstream chute 70*a*. Shaft member 101 is rotated by, for example, a stepping motor (not illustrated).

Storage part 102 is for storing drugs. Storage part 102 protrudes from shaft member 101 toward the outside and has a plate shape that extends in a direction along the axis line of shaft member 101.

Delivery part 103 is configured to send out the drug stored by storage part 102. Delivery part 103 protrudes toward the outside from shaft member 101 at a position different from the position, from which storage part 102 protrudes, in the circumferential direction of shaft member 101. Delivery part 103 has a plate shape that extends in a direction along the axis line of shaft member 101.

Storage part 102 and delivery part 103 each include a tip portion formed from an elastic material, such as rubber. With this configuration, even when the tips of storage part 102 and delivery part 103 come into contact with third bottom wall 71*a* and third top wall 74*a*, the rotation of rotating member 100 is not hindered. Storage part 102 and delivery part 103 may be formed of brushes.

Rotating member 100 stores drugs when rotating member 100 is located at a storage position where the tip of storage part 102 faces third bottom wall 71*a*, and the tip of delivery part 103 faces third top wall 74*a*. Specifically, storage part 102 stores a drug by blocking the drug introduced from third inlet 75*a*. When rotating member 100 rotates clockwise in FIG. 5, delivery part 103 pushes out or knocks out the drug stored in storage part 102, thereby sending the drug to the downstream side of upstream chute 70*a*.

In the following, the movement of drugs conveyed by third rear chute 50*a* will be described. Drugs led out from fifth passage W5 are introduced into third inlet 75*a*. The drugs are stored by storage part 102 of rotating member 100 located at the storage position.

As rotating member 100 rotates clockwise in FIG. 5, the drugs are sent out by delivery part 103. The sent drugs travel downstream along the plate surface of third bottom wall 71*a*. Some of the drugs travel along third inclined surface 76*a* or hit third inclined surface 76*a* and bounce.

The drugs having passed through upstream chute 70*a* travel downstream through connecting part 80*a*. Some of the drugs hit bouncing wall 81*a* and are bounced downward by bouncing wall 81*a*.

The drugs are led out from connecting part 80*a* into downstream chute 90*a*, and travel downstream along fourth bottom wall 91*a*. Some of the drugs travel along fourth inclined surface 96*a* or hit fourth inclined surface 96*a* and bounce.

As described above, the upstream inclination angle α and the downstream inclination angle β are set to be 45 degrees or less. This configuration can prevent the following problems: the speed of a drug slows down when the drug travels along inclined surface 76*a* or 96*a*, or when a drug hits inclined surface 76*a* or 96*a*, the drug bounces in a direction that is significantly different from the conveyance direction.

In addition, the distance in the left-right direction between third inlet 75*a* and third outlet 95*a* in third rear chute 50*a* is relatively short. In such a case, when third rear chute 50*a* does not include connecting part 80*a*, the path for conveying a drug does not include bent part B, thereby shortening the length of the path as compared to the case where third rear chute 50*a* includes connecting part 80*a*. As a result, the change rate of the width of third rear chute 50*a* in the front-rear direction would increase.

Specifically, the inclination angle of the inclined surface of the side wall with respect to the left-right direction would increase. As a result, when the inclination angle exceeds 45 degrees, third rear chute 50*a* cannot smoothly convey a drug. Specifically, a drug cannot be smoothly conveyed from the following reasons: the speed of the drug slows down when the drug travels along an inclined surface, or when the drug hits the inclined surface, the drug bounces in the direction significantly different from the conveyance direction.

Herein, as third rear chute 50*a* includes connecting part 80*a*, the path for conveying a drug includes bent part B, thereby increasing the length of the path as compared to the case where third rear chute 50*a* does not include connecting part 80*a*. As a result, the change rate of the width of third rear chute 50*a* in the front-rear direction decreases. Specifically, the upstream inclination angle α and the downstream inclination angle ß decrease. That is, even in a case where the distance in the left-right direction between third inlet 75*a* and third outlet 95*a* is relatively short, the upstream inclination angle α and the downstream inclination angle ß can be set to be 45 degrees or less. Therefore, third rear chute 50*a* can smoothly convey a drug. In other words, third rear chute 50*a* can prevent the following problems: the speed of a drug slows down when the drug travels along an inclined surface, or when a drug hits the inclined surface, the drug bounces in a direction that is significantly different from the conveyance direction.

In addition, as a drug is sent out by delivery part 103, the speed of the drug is larger on the upstream side than on the downstream side in third rear chute 50*a*. The length of the rebound when a drug hits third inclined surface 76*a* of upstream chute 70*a* is greater than when the drug hits fourth inclined surface 96*a* of downstream chute 90*a*.

Herein, the upstream inclination angle α is set to be smaller than the downstream inclination angle β as described above. This configuration can reduce the length of rebound in upstream chute 70*a* when a drug hits third inclined surface 76*a*. Therefore, the following can be prevented: the timing at which the drug is led out is delayed due to the drug bouncing far away in the direction significantly different from the conveyance direction.

The drug is led out from downstream chute 90*a* into shutter part 60 via first rear chute 30*a*. When the shutter is in the opened state in shutter part 60, the drug is led into hopper 15.

The present disclosure is not limited to the embodiment described above. Various modifications to the present embodiment are also included within the scope of the present disclosure, as long as they do not depart from the spirit of the present disclosure.

For example, third chute 50 has a square cross section, but may have a circular cross section, a U-shaped cross section, or a V-shaped cross section. That is, upstream chute 70*a* may be formed of a side wall that does not have a portion that can clearly distinguish third bottom wall 71*a*, third front wall 72*a*, third rear wall 73*a*, and third top wall 74*a* from each other.

Upstream chute 70*a*, connecting part 80*a*, and downstream chute 90*a* are integrated; however, those components may be separate bodies. Third chute 50 may be formed by upstream chute 70*a* and downstream chute 90*a* without including connecting part 80*a*. In this case, downstream chute 90*a* is formed to receive a drug having passed through upstream chute 70*a*.

Path R may have a shape such that path R is bent at bent part B, not being folded back. In this case, in a top view of third rear chute 50*a*, connecting part 80*a* is formed in such a way that third inlet 75*a* and third outlet 95*a* are located on opposite sides with connecting part 80*a* therebetween.

Bouncing wall 81*a* may face in a direction other than diagonally downward. The connecting part 80*a* does not need to include bouncing wall 81*a*.

The change rates of widths of upstream chute 70*a*, connecting part 80*a*, and downstream chute 90*a* in the front-rear direction may not be constant. Specifically, in third rear chute 50*a*, front walls 72*a*, 82*a*, 92*a* and rear walls 73*a*, 83*a*, 93*a* may have a curved plate shape.

Chute unit 14 does not need to include rotating member 100. In this case, drugs pass through first to third chutes 30 to 50 only by their own weights. The speed of the drug thus increases toward the downstream side in the chute. Therefore, the length of the rebound when a drug hits fourth inclined surface 96*a* of downstream chute 90*a* is greater than when the drug hits third inclined surface 76*a* of upstream chute 70*a*.

The change rate of the width of downstream chute 90*a* in the front-rear direction then may be set to be smaller than the change rate of the width of upstream chute 70*a* in the front-rear direction. Specifically, the downstream inclination angle ß may be set to be smaller than the upstream inclination angle α. This configuration can reduce the length of rebound in downstream chute 90*a* when a drug hits fourth inclined surface 96*a*. Therefore, the following can be prevented: the timing at which the drug is led out is delayed due to the drug bouncing far away in the direction significantly different from the conveyance direction. This application is entitled to and claims the benefit of Japanese Patent Application No. 2021-176521 filed on Oct. 28, 2021, the disclosure of which including the specification, drawings, and abstract is incorporated herein by reference in its entirety.

INDUSTRIAL APPLICABILITY

The present invention is widely available for drug supply apparatuses.

REFERENCE SIGNS LIST

1 Drug supply apparatus
14 Chute unit
30 First chute
40 Second chute
50 Third chute
70*a* Upstream chute
80*a* Connecting part
81*a* Bouncing wall
90*a* Downstream chute
100 Rotating member
103 Delivery part
B Bent part
C Tablet case
R Path

The invention claimed is:

1. A drug supply apparatus, comprising:

a plurality of tablet cases for discharging a drug, the plurality of tablet cases being lined up in a front-rear direction of the drug supply apparatus; and a chute disposed at a position lower than a position of the plurality of tablet cases, the chute including a path for conveying the drug, the chute conveying the drug while preventing the drug from spilling from a front side and a rear side of the chute, wherein the chute includes a rotating member disposed in the path and configured to contact the drug and impart a force to the drug to move the drug along the path, a width of the chute in the front-rear direction becomes smaller toward a downstream side in the chute, and the path includes a bent part having a shape such that the bent part is bent when viewed from the front side.

2. The drug supply apparatus according to claim 1, wherein the chute includes an upstream chute portion disposed upstream of the bent part and a downstream chute portion disposed downstream of the bent part.

3. The drug supply apparatus according to claim 2, wherein the path has a shape such that the path is folded back at the bent part when viewed from the front side.

4. The drug supply apparatus according to claim 3, wherein the chute includes a bouncing wall that bounces, at the bent part, the drug toward the downstream chute portion, the drug having passed through the upstream chute portion.

5. The drug supply apparatus according to claim 4, wherein the bouncing wall is disposed so as to face diagonally downward.

6. The drug supply apparatus according to claim 2, wherein a change rate of a width of the downstream chute portion in the front-rear direction is smaller than a change rate of a width of the upstream chute portion in the front-rear direction.

7. The drug supply apparatus according to claim 2, wherein the rotating member further comprises a delivery part that is attached to the upstream chute portion and configured to send out the drug to the downstream side in the chute, wherein a change rate of a width of the upstream chute portion in the front-rear direction is smaller than a change rate of a width of the downstream chute portion in the front-rear direction.

8. The drug supply apparatus according to claim 1, wherein the chute includes a front wall for preventing the drug from spilling from the front side and a rear wall for preventing the drug from spilling from the rear side.

9. The drug supply apparatus according to claim 1, wherein the rotating member comprises a shaft member having an axis extending in the front-rear direction, and the shaft member is configured to be rotatable about the axis.

10. The drug supply apparatus according to claim 9, wherein the rotating member further comprises a storage part protruding from the shaft member, and the storage part has a plate shape extending along the axis.

11. The drug supply apparatus according to claim 10, wherein the rotating member further comprises a delivery part disposed at a position different from the storage part, and the delivery part has a plate shape extending along the axis.

* * * * *